W. C. ANDREWS & H. A. AUER.
TOOL FOR RIFLING AND PLANING GUN BARRELS.
APPLICATION FILED OCT. 23, 1916.
1,239,660.
Patented Sept. 11, 1917.
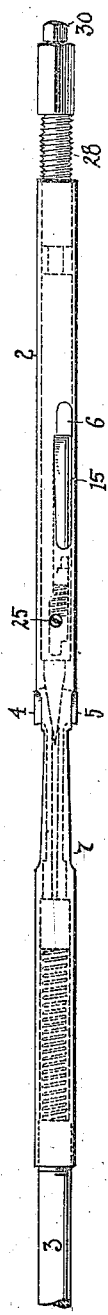
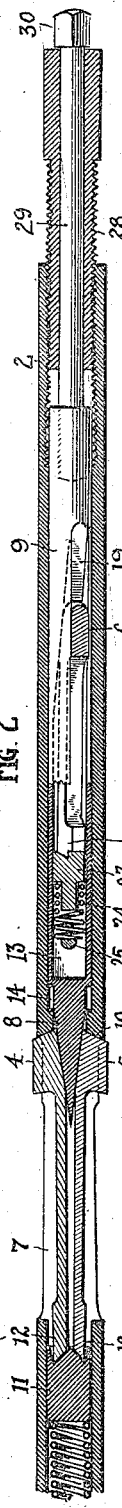
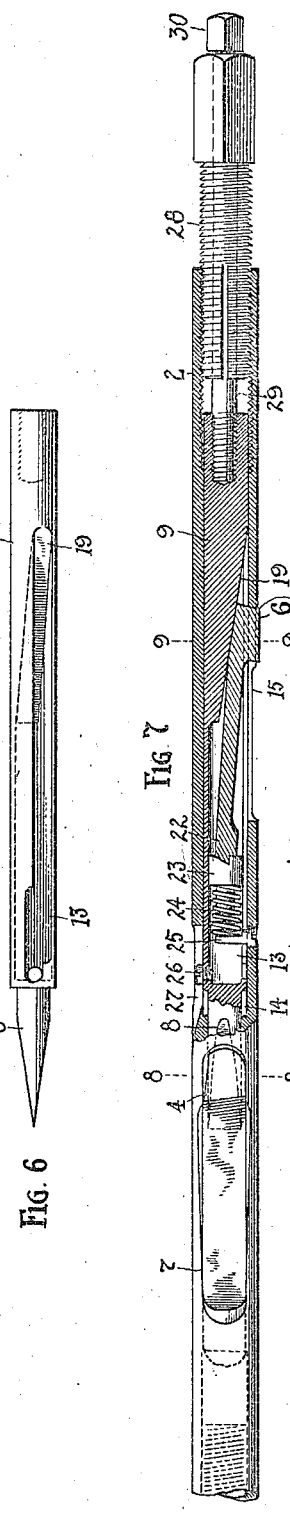
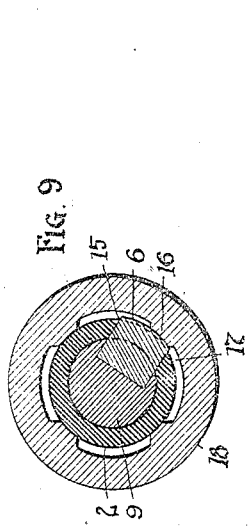
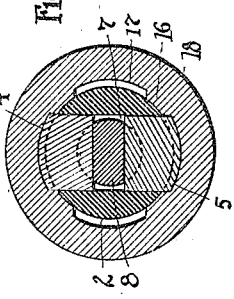
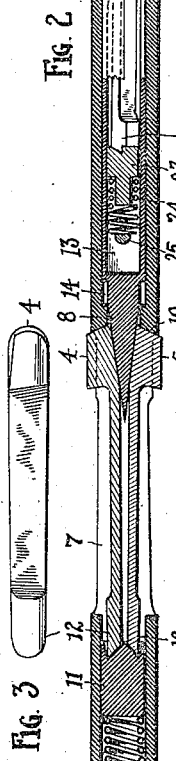
Witness
F. C. Harrold
Inventors
William C. Andrews
Harry A. Auer
by
Fisher & Moers
Attorneys

UNITED STATES PATENT OFFICE.

WILLIAM C. ANDREWS AND HARRY A. AUER, OF CLEVELAND, OHIO; SAID ANDREWS ASSIGNOR TO SAID AUER.

TOOL FOR RIFLING AND PLANING GUN-BARRELS.

1,239,660.  Specification of Letters Patent.  Patented Sept. 11, 1917.

Application filed October 23, 1916. Serial No. 127,072.

*To all whom it may concern:*

Be it known that we, WILLIAM C. ANDREWS and HARRY A. AUER, citizens of the United States, residing at Cleveland, in the county of Cuyahoga and State of Ohio, have invented certain new and useful Improvements in Tools for Rifling and Planing Gun-Barrels, of which the following is a specification.

This invention comprises a tool for rifling and planing gun barrels, and the tool is particularly constructed to cut spiral grooves in a roughly bored barrel and plane the land portions between the spiral grooves in the same operation until finally the diameter or caliber of bore desired, is obtained. In making gun barrels, the known and general practice is to first drill a hole lengthwise through the barrel and then enlarge this hole to a predetermined diameter or caliber by using rotary reamers and reaming repeatedly. The next operation involves the cutting of a series of grooves spirally within the reamed barrel by repeated draw cutting operations while the barrel is being slowly rotated, a process which produces a series of spiral ribs or lands between the grooves. Our object is to provide a single tool adapted to produce a finished rifle barrel without resorting to reaming operations, thereby effecting a material saving in time, labor and cost, and also a better product by avoiding the cross cutting operations of the reamer in the bore, and a further object is to provide a tool in which one or more groove cutters and one or more land planers are jointly operated and adjusted for varying depths of cut by a common means, and in which the groove cutters produce the grooves as a first step in operations and the land planer or planers come into action to plane the bore longitudinally to the desired diameter or caliber during the final steps of groove cutting operations.

The general objects as stated, are embodied in the cutting tool shown and described in an application filed January 21, 1916, Serial Number 73355, by W. C. Andrews, one of the joint inventors named herein, but the present tool is modified therefrom in several essential particulars, the object being to produce a more durable assembly adapted to speed up operations and effect more efficient results as well as to simplify the construction of the cutters and facilitate the production and sharpening thereof.

In the accompanying drawings, Figure 1 is a side view of the tool, full size. Fig. 2 is a section longitudinally on the axis of the tool, but enlarged as compared with Fig. 1. Figs. 3, 4 and 5 are plan views of the three cutters used in the tool. Fig. 6 is a side view of the reciprocable member used to spread the three cutters. Fig. 7 is partly a plan view of Fig. 2 and partly a section longitudinally of the tool on a central line through the land planer. Fig. 8 is a magnified view in cross section on line 8—8, Fig. 7, showing the tool in working position within a rifled gun barrel. Fig. 9 is a similar view to Fig. 8, but is taken on line 9—9, Fig. 7, to show the planer cutting the land portion between two grooves in the rifled barrel.

The tool is of relatively small diameter and consists of a tubular body 2 which is firmly affixed at one end to a rod 3 adapted to be reciprocated and rotated by suitable mechanism forming part of any rifling machine found in general use. A reciprocable movement is imparted to the tool through rod 3 to produce a draw cut in one direction of its movement, and the cutters are collapsed upon the return of the tool through the barrel for a repetition of operations, and a rotatable movement is also given to the tool to produce a spiral cut. The gun barrel is also given a partial rotation at intervals to produce a series of equi-distant radial grooves and lands therein. The present tool is capable of cutting four spiral grooves and the same number of lands, but obviously the tool may be easily modified or the operations changed to produce five or six grooves or lands according to accepted standards.

As shown, body 2 houses three cutters, two groove cutters 4 and 5, and a land cutter or planer 6. These cutters are of the hook type for draw-cutting operations and have curved segmental cutting edges to produce a smooth round bore and the groove cutters 4 and 5 are mounted opposite each other in reverse facial relation within a transverse slot 7 in the body 2. A reciprocable member 9 within the front portion of body 2 has a wedge or tapering extremity 8 which separates the head or hook ends of said cutters and bears against the oppositely-related inclined faces thereof to hold them fixedly in position against the undercut portions 10 of the body at the end of slot 7, see Fig. 2. However, both hook cutters may be spread or forced outward more or less by the wedge 8 when the tool is traveling to the right and member 9 is arrested by a stop, and the outward movement of the cutters is facilitated by the use of a spring-pressed plunger 11 or an equivalent device adapted to provide a yielding seat for the beveled foot portion 12 of each cutter 4 and 5, see Fig. 2. Spreader member 9 is cylindrical and slides within limits in a round bore 14 in body 2, and member 9 is also hollow or chambered in part to hold the land planer 6 which has its cutting head projected through an open slot 15 in the side of body 2 at a point in the rear of cutters 4 and 5 and on a different radial line relatively thereto so as to come opposite the land portions 16 produced by cutting the grooves 17 in the gun barrel 18, see Fig. 9. The land planer 6 is not quite as wide as the cutters 4 and 5 but otherwise corresponds closely thereto in general shape and appearance, and has an inclined face at the back of its cutting head which bears and rides upon an inclined or wedge-shaped portion 19 of spreader member 9. The beveled end 20 of the planer head abuts against the undercut end of slot 15, and the pointed foot portion 22 of the planer seats within a notched plunger 23 which is backed by a coiled spring 24 bearing against a stationary rest comprising a screw 25 anchored in body 2 but extending into the open side of chamber 13 to permit a limited movement endwise of spreader member 9. A second screw 26 affixed to member 9 has its head slidably seated in a short slot 27 in the side of body 2, see Fig. 7, and the main function of screw 26 is to provide engaging means wherewith member 9 may be moved to the right within the tool body so as to collapse the cutters subsequently to each draw cutting operation and preliminary to a return movement of the tool through the barrel. A screw stop 28 in the end of body 2 limits the outward movement of the spreader member 9 in variable degree relatively to body 2, and a smooth stem 29 affixed to member 9 passes centrally through the screw stop 28 and has an angular head 30 which is also adapted to limit the inward movement of the stem and spreader member 9 relatively to said stop. Screwing the stop into body 2 permits the spreader member to be moved farther to the left for a wider spreading action of the cutters, and this result is brought about intermittently so as to produce a gradually deepening cut, particularly as many draw cuts are required to rifle the rough bore completely and plane it to a predetermined caliber. The land planer 6 is made with a shallower head or is retired farther within the body than the groove cutters so that it will not emerge and come into cutting engagement with the land portions 16 of the gun barrel until the groove cutters 4 and 5 have practically completed their work. In other words, the curved cutting edges of the cutters 4 and 5 are projected outwardly of body 2 a greater radial distance than the land planer 6. In this way, the screw stop 28 may regulate the movement of the spreader member 9 and therethrough the spreading movement of the groove cutters and land planer jointly so that the initial cutting operations merely involve the groove cutters 4 and 5 while the final cutting operations involve both the groove cutters and the land planer until the desired caliber is obtained.

As shown the curvature of the cutting edge of the groove cutter is of larger radius than the cutting edge of the land planer.

Attention is called in this connection to application Serial Number 141,744, January 11, 1917, for a method of producing a gun barrel.

What we claim is:

1. A tool for rifling and planing gun barrels, comprising a cylindrical member having a hook cutter adapted to produce a groove by repeated draw cutting operations and a planing element adapted to finish a land portion adjacent the groove during final draw cutting operations, said groove cutter and planing element each having continuous cutting edges of regular curvature the full width thereof.

2. A tool for rifling and planing gun barrels, comprising a cylindrical member having a hook cutter with a circular cutting edge adapted to produce a series of grooves by repeated draw cutting operations and a planing element with a circular cutting edge adapted to finish the complete land portion between two adjacent grooves during final draw cutting operations, said cutter and planing element being mounted one in advance of the other longitudinally of the cylindrical member, and adjustable means to station said groove cutter and land planing element with their respective cutting edges at different distances radially from the axis of the tool.

3. A tool for rifling and planing gun barrels, comprising a cylindrical body having a groove cutter and a separate land planer mounted on diverging radial lines to extend beyond the side of said body, said cutter and planer each having a continuous curved cutting edge the full width thereof but of different radii.

4. A tool for rifling and planing gun barrels, comprising a cylindrical body, a groove cutter and a separate land planer mounted on diverging radial lines one in advance of the other within said body and adapted to extend through the side thereof, the respective cutting edges of said groove cutter and land planer being positioned at different radial distances from the axis of the tool, and spreading means within said body engaging said cutter and planer at different points longitudinally of the body.

5. A tool for rifling and planing gun barrels, comprising a tubular body having a groove cutter and a separate land planer mounted one in advance of the other longitudinally of said body, and means within said body to spread said groove cutter and land planer outwardly and project said cutter to a greater distance beyond the side of said body than said planer.

6. A tool for rifling a gun barrel in a roughly bored state and planing the bore to a predetermined diameter, comprising a body having an adjustable groove cutter and an adjustable land planer one in advance of the other, and a common means to spread said cutter and planer jointly beyond the side of said body with the said cutter advanced bodily to a greater distance beyond the side than said planer.

7. In a tool for rifling and planing gun barrels, a cylindrical member having a plural number of groove cutters mounted in reverse facial relation therein, in combination with a planing element mounted upon said member in co-working relation with said groove cutters to enlarge the bore of the gun barrel simultaneously with groove cutting operations, the cutting edge of said planing element being at a less distance from the axis of the tool than the cutting edge of the groove cutters.

8. In a tool for rifling and planing gun barrels, a cylindrical body having a groove cutter and a land planer movable substantially radially therein with their respective cutting edges projected different distances from the axis of the tool and placed one in advance of the other longitudinally of the tool, a spreader member having a wedge at one end and an inclined face at one side adapted to force said cutter and planer respectively radially outward, and means to produce a reciprocable movement of said spreader member.

9. In a tool for rifling and planing gun barrels, a radially slotted body, a pair of separate oppositely-seated groove cutters and a separate land planer mounted for substantially radial movement in the slots of said body, a reciprocable member having a wedge engaged with both cutters and provided with an inclined face at one side engaged with said planer, and an adjustable stop for said member.

10. In a tool for rifling and planing gun barrels, a cylindrical body having radial slots at different places longitudinally therein, a groove cutter and a planer in said slots having curved segmental cutting edges of different radii the full width thereof, and means to move said groove cutter and land planer relatively different distances from the axis of the tool to first produce a groove and finally plane the land adjacent the groove in the last stages of groove cutting operations.

11. In a tool for rifling and planing gun barrels, a slotted body having a central bore, a groove cutter and a separate land planer extending through said slotted body variable distances from the axis on different radial lines and in different places longitudinally thereof, a reciprocable wedge member slidably mounted within said bore in operable side thrust engagement with said cutter and planer, an adjustable stop to limit the reciprocable movement of said wedge member, and means extending through the side of said body and the end thereof adapted to impart reciprocable movement to said wedge member.

12. A tool adapted to cut spiral grooves in a roughly-bored gun barrel and plane land portions between the spiral grooves in the same operation, comprising a cylindrical body having a central bore and side slots longitudinally therein, a chambered spreader member having a tapering extremity and an inclined portion at one side, a pair of groove cutters engaged by said tapering extremity and a land planer within said chambered spreader and in bearing engagement with said inclined portion, said cutters and planer extending through said slots, and means adapted to adjustably limit the longitudinal movement of said spreader member.

13. A tool adapted to cut spiral grooves in a roughly-bored gun barrel and plane land portions between the spiral grooves in the same operation, comprising a cylindrical body having a central bore and a series of radial slots successively therein, a pair of groove cutters and a land planer extending through said slots, a chambered spreader member having an inclined portion adapted to seat said land planer and provided with a wedge-shaped extremity intermediate said groove cutters, spring means adapted to collapse both cutters and also the land planer upon a retiring movement of the spreader member, means adapted to communicate reciprocable movements to said spreader member, and means to regulate the movement of the spreader member relatively to said cutters and land planer.

14. A tool adapted to cut spiral grooves in a roughly-bored gun barrel and plane the land portions between the grooves in the same operations, comprising a cylindrical body having a central bore and radial slots at intervals longitudinally thereof, a pair of groove cutters seated oppositely in one of said slots, a pressure-applying device adapted to hold said cutters in position for radial movement in said body, a chambered spreader member slidably confined within said bore having a wedge-shaped extension engaged with said cutter and provided with an inclined portion in its chambered part, a land cutter seated in said chambered member and extending through one of said body slots in bearing engagement with said inclined portion, pressure applying means adapted to hold said land planer in position for radial movement in said spreading member and body, and means adapted to impart a reciprocable movement to said spreader member.

Signed at Cleveland, in the county of Cuyahoga and State of Ohio, this 17th day of October, 1916.

WILLIAM C. ANDREWS.
HARRY A. AUER.

Copies of this patent may be obtained for five cents each, by addressing the "Commissioner of Patents, Washington. D. C."